(12) United States Patent
Kern et al.

(10) Patent No.: US 7,712,444 B2
(45) Date of Patent: May 11, 2010

(54) SHEATHED-ELEMENT GLOW PLUG

(75) Inventors: Christoph Kern, Aspach (DE);
Reinhold Hess, Winterthur (CH); Reiko Zach, Remseck (DE); Michael Kleindl, Schweiberdingen (DE); Peter Wolfer, Kleinandelfingen (CH); Steffen Schott, Schweiberdingen (DE); Claudio Cavalloni, Regensdorf (CH); Pavlo Saltikov, Waiblingen (DE); Michael Mueller, Rickenbach-Salz (CH); Andrea Bertola, Zurich (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/158,795

(22) PCT Filed: Nov. 23, 2006

(86) PCT No.: PCT/EP2006/068787

§ 371 (c)(1),
(2), (4) Date: Nov. 14, 2008

(87) PCT Pub. No.: WO2007/073998

PCT Pub. Date: Jul. 5, 2007

(65) Prior Publication Data

US 2009/0165739 A1 Jul. 2, 2009

(30) Foreign Application Priority Data

Dec. 23, 2005 (DE) ............... 10 2005 061 877
Feb. 24, 2006 (DE) ............... 10 2006 008 639

(51) Int. Cl.
*F23Q 7/22* (2006.01)

(52) U.S. Cl. ................................. 123/145 A
(58) Field of Classification Search ............ 123/145 R, 123/145 A, 143 B; 73/114.19
See application file for complete search history.

(56) References Cited

U.S. PATENT DOCUMENTS

| 7,185,621 | B2* | 3/2007 | Yamada et al. ......... 123/145 A |
| 7,337,657 | B2* | 3/2008 | Haussner et al. ........ 73/114.18 |
| 7,350,494 | B2* | 4/2008 | Schricker et al. ....... 123/145 A |
| 7,581,520 | B2* | 9/2009 | Kern et al. ............. 123/145 A |
| 2001/0015402 | A1* | 8/2001 | Murai et al. ............... 248/554 |
| 2005/0061063 | A1 | 3/2005 | Haussner et al. |
| 2005/0211214 | A1* | 9/2005 | Tomita et al. .......... 123/145 A |
| 2005/0252297 | A1 | 11/2005 | Heinzelmann et al. |
| 2007/0228030 | A1* | 10/2007 | Boucard et al. ............ 219/270 |

(Continued)

FOREIGN PATENT DOCUMENTS

DE 103 43 521 4/2005

(Continued)

OTHER PUBLICATIONS

International Search Report, PCT International Patent Application No. PCT/EP2006/068787, dated Apr. 12, 2007.

*Primary Examiner*—Hai H Huynh
(74) *Attorney, Agent, or Firm*—Kenyon & Kenyon LLP

(57) ABSTRACT

A sheathed-element glow plug is used to be situated in a chamber in an internal combustion engine. The sheathed-element glow plug has a housing, a pin-shaped heating element, which extends partially from the housing and a pressure sensor which is situated in an inner chamber of the housing. A prestressing sleeve is provided, in this context, which applies a prestressing to the pressure sensor.

9 Claims, 2 Drawing Sheets

U.S. PATENT DOCUMENTS

| | | | |
|---|---|---|---|
| 2007/0240661 A1* | 10/2007 | Ludwig et al. | 123/145 R |
| 2007/0295710 A1* | 12/2007 | Yamada et al. | 219/270 |
| 2008/0028841 A1* | 2/2008 | Ludwig et al. | 73/115 |
| 2008/0142496 A1* | 6/2008 | Itoh et al. | 219/270 |
| 2008/0264373 A1* | 10/2008 | Boehland et al. | 123/145 A |
| 2009/0026889 A1* | 1/2009 | Wolfer et al. | 310/338 |

FOREIGN PATENT DOCUMENTS

| | | |
|---|---|---|
| DE | 103 46 330 | 5/2005 |
| EP | 1 598 651 | 11/2005 |

* cited by examiner

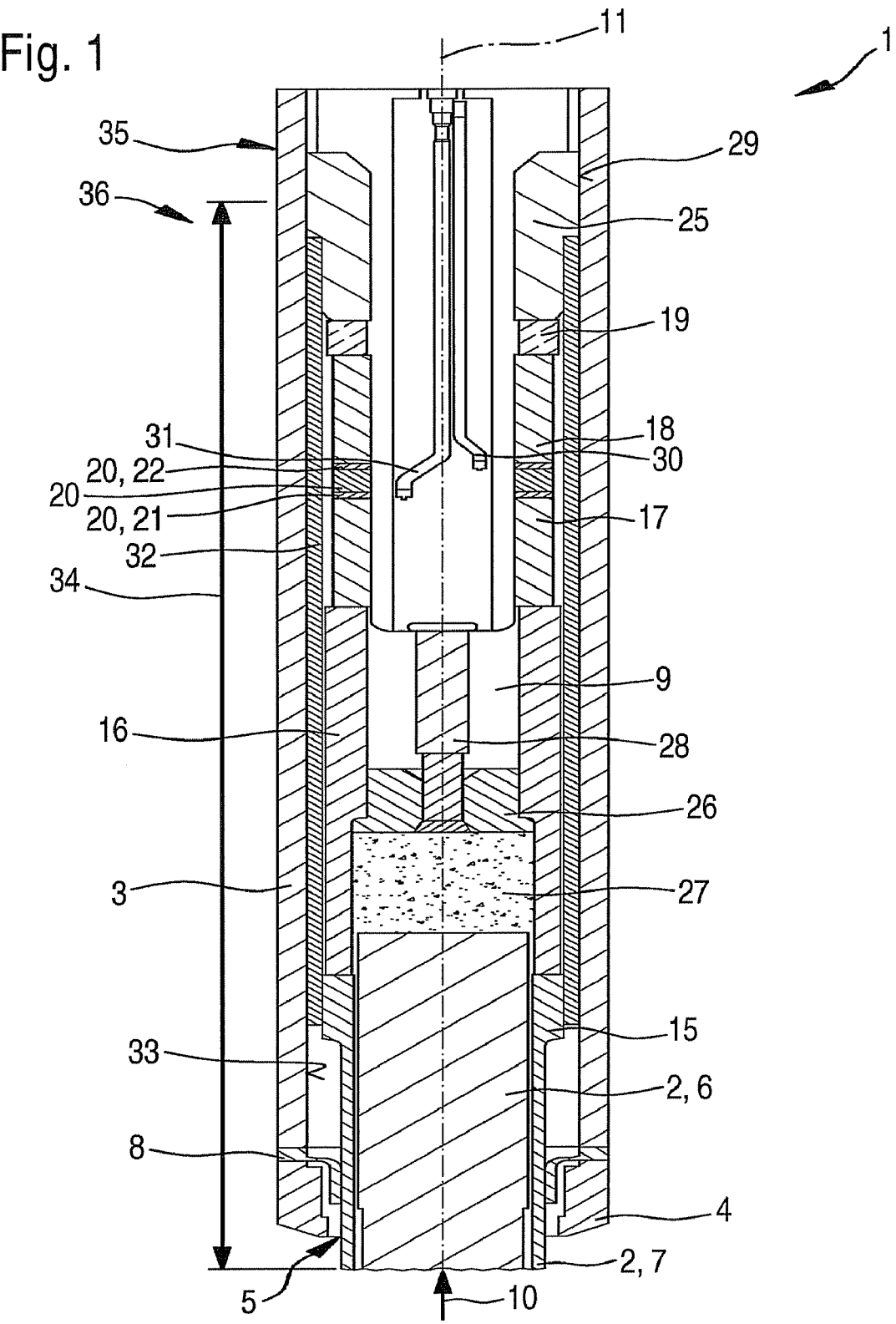

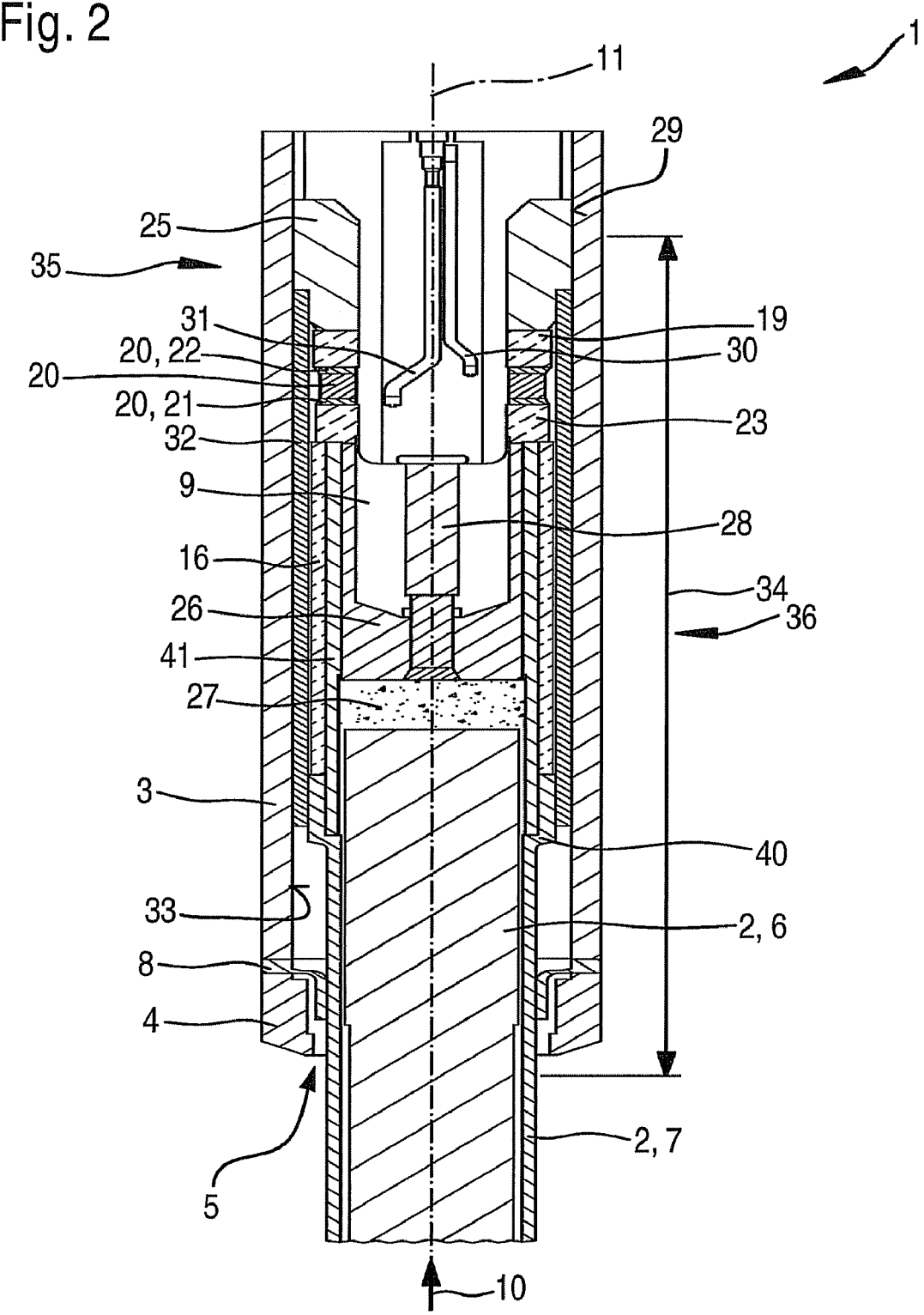

SHEATHED-ELEMENT GLOW PLUG

FIELD OF THE INVENTION

The present invention relates to a sheathed-element glow plug to be situated in a chamber in an internal combustion engine. The present invention also relates to a sheathed-element glow plug to be situated in a prechamber, swirl chamber or combustion chamber of an air compressing, self-igniting internal combustion engine.

BACKGROUND INFORMATION

A pressure-measuring glow plug for a Diesel engine is described in German Published Patent Application No. 103 43 521. The pressure-measuring glow plug has a plug element and a heating pin situated in the plug element. Furthermore, between the heating pin and the plug element there is a pressure sensor, the pressure sensor being influenced by the pressure, in the combustion chamber of the cylinder, that is transmitted by the heating pin. A diaphragm is also provided which seals the pressure sensor from the combustion chamber.

The pressure-measuring glow plug described in German Published Patent Application No. 103 43 521 has the disadvantage that the diaphragm is exposed to considerable stresses when the pressure-measuring glow plug is incorporated in the cylinder, because of the required installation force, whereby damage to the diaphragm may occur. Besides, the diaphragm is situated in the force path between the heating pin and the pressure sensor, so that the pressure measurement is impaired. A further disadvantage of the pressure-measuring glow plug is the great distance of the pressure measuring sensor from the conical seal of the plug element, since, because of that, natural vibrations of the pressure-measuring glow plug are favored at low frequencies. These natural frequencies may make the measurement of the pressure worse or impossible, and in an extreme case may result in the destruction of the pressure-measuring glow plug.

SUMMARY

The sheathed-element glow plug according to example embodiments of the present invention, having the features described herein, has the advantage that the pressure sensor is able to have a certain prestressing applied to it. Thereby, in particular, possible gaps between the individual elements in the force path between the heating pin and the pressure sensor are able to be prevented, so that a reliable measurement of the pressure prevailing in the chamber is made possible.

The prestressing element is advantageously designed as a sleeve-shaped prestressing element, the pressure sensor being situated in the interior of the sleeve-shaped prestressing element. Because of the sleeve-shaped prestressing element, the heat reaching into the housing, from the heating element and because of combustion gases, is able to be dissipated via the sleeve-shaped prestressing element to a fixing element and from it to the housing, as a result of which the temperature of the pressure sensor in operation is essentially constant, so that temperature-conditioned corruptions of the measuring results are reduced. Moreover, because of the positioning of the pressure sensor on the inside of the sleeve-shaped prestressing element, a compact construction of the sheathed-element glow plug is made possible, in which the pressure sensor is able to be situated closer to the heating element.

It is also advantageous that the prestressing element is situated at a distance from an inner wall of the housing. This avoids contact between the prestressing element and the housing, so that frictional losses are prevented. In addition, the influencing of the prestressing specified by the prestressing element is prevented in this manner.

One or more compensation elements are provided in an advantageous manner which, together with the pressure sensor, have prestressing applied to them by the prestressing element via the heating element and the fixing element, the compensation elements being used for compensating for the stressing of the pressure sensor, conditioned upon thermal changes in length of components of the force path of the sheathed-element glow plug. The components of the force path of the sheathed-element glow plug may have greatly different coefficients of thermal expansion, so that temperature changes lead to substantial differences in the expansion of the components. The compensation elements are used to compensate for these expansion differences in the axial direction, in order to reduce or eliminate completely the thermal influence on the pressure measurement. The compensation, in this context, relates mainly to the components situated in the force path, that is, the prestressing element and the components, together with the pressure sensor, having the prestressing applied to them by the prestressing element. The compensation elements are preferably situated between the pressure sensor and the heating element and/or the pressure sensor and the fixing element.

It is advantageous that a metallic force transmission sleeve is provided, that the force transmission sleeve is in operative connection with the pressure sensor, that within the force transmission sleeve there is situated a metal terminal stud, connected to the force transmission sleeve, which is connected to a glow current line, and which is used for supplying electrical energy to the heating element, and that the force transmission sleeve is electrically insulated from the metal terminal stud. This makes possible a compact construction of the sheathed-element glow plug, in which the pressure sensor is able to be positioned close to the heating element, so that the frequency of natural vibrations may be shifted to higher frequency ranges. What is also made possible is the use of easily workable, and thus cost-effective, elements. In particular, instead of a ceramic force transmission sleeve, which is costly to process, a force transmission sleeve made of a metal may be used. The per piece costs of the sheathed-element glow plug may thereby be reduced.

It is advantageous, in this context, that the force transmission sleeve is coated with an electrically insulating insulating layer on an inside surface, or that an electrically insulating sleeve is provided that lies against the inside surface. The electrical insulation takes place with respect to the metal terminal stud, in this instance.

Furthermore, it is advantageous that, for sealing the inner chamber from the chamber of the internal combustion engine, a metal diaphragm is provided which, on the one hand, is connected to the heating element and, on the other hand, to the housing, in the installed state of the sheathed-element glow plug, the metal diaphragm being partially mechanically unloaded by the amount of the prestressing force, with respect to the sum of the installation force and the prestressing force. The reduction in the stressing of the metal diaphragm conditional upon the prestressing force makes possible a flexible, particularly an elastic design of the metal diaphragm, in order to ensure that the measuring of the pressure has sufficient accuracy, damage to the metal diaphragm being prevented at the same time.

Preferred exemplary embodiments of the present invention are explained in greater detail in the following description, in light of the added drawings.

BRIEF DESCRIPTION OF THE DRAWINGS

FIG. 1 illustrates a first exemplary embodiment of sheathed-element glow plug according to the present invention in a schematic sectional view.

FIG. 2 illustrates a second exemplary embodiment of a sheathed-element glow plug according to the present invention in a schematic sectional view.

DETAILED DESCRIPTION

FIG. 1 shows a first exemplary embodiment of a sheathed-element glow plug 1 in an axial sectional representation. Sheathed-element glow plug 1 may be developed particularly as sheathed-element glow plug 1 for an air-compressing, self-igniting internal combustion engine. In the case of prechamber engines and swirl chamber engines, a pin-shaped heating element 2 of sheathed-element glow plug 1 extends into the chamber of the internal combustion engine and, in the case of engines having direct injections, into a chamber of the engine. However, sheathed-element glow plug 1 is also suitable for other applications.

Sheathed-element glow plug 1 has a housing 3. The housing includes a sealing cone 4, pin-shaped heating element 2 extending out of housing 3 into the chamber of the internal combustion engine, at an opening 5 of sealing cone 4 on the chamber side. Pin-shaped heating element 2 includes a ceramic heating member 6 and a support member 7 which circumferentially encloses ceramic heating member 6 at least section by section. Between sealing cone 4 and the remaining part of housing 3, a metal diaphragm 8 is provided, which may particularly be developed as a steel diaphragm 8. Steel diaphragm 8 is connected, on the one hand, to support element 7 of heating element 2, in this context, and, on the other hand, to housing 3, in order to seal an inner chamber 9 of sheathed-element glow plug 1 from the chamber of the internal combustion engine. Inner chamber 9 thus represents a part of a concentric through-hole of housing 3.

The application of a pressure prevailing in the chamber of the internal combustion engine to heating element 2 is achieved in an axial direction 10, that is, in the direction of an axis 11 of housing 3. The force acting on heating element 2, in this instance, is transmitted via a collar 15 of support element 7, at which support element 7 has an enlarged diameter, via a force-transmitting sleeve 16 and a compensation element 17 to a pressure sensor 20. Pressure sensor 20 is supported, in this instance, via a compensation element 18 and an insulating disk 19 on a fixing element 25. Force-transmitting sleeve 16 has a shouldered hole to ensure support for a metal terminal stud 26, which is electrically contacted to a ceramic layer of ceramic heating member 6 via a graphite filling 27. Metal terminal stud 26 is able to have applied to it an electrical supply voltage, via an at least partially flexibly designed glow current line 28. Support pipe 7 is also connected to housing 3 of sheathed-element glow plug 1 via metal diaphragm 8, to close the circuit.

Pressure sensor 20 has annular contact elements 21, 22, which are connected to measuring lines 30, 31. Preferably metallic fixing element 25 is connected to housing 3 by a welded connection 29, or the like. Insulating disk 19 ensures, in this context, an insulation from electrically conductive compensation element 18, which is connected to annular contact element 22.

When the pressure in the chamber is applied to heating element 2, a part of pressure sensor 20, that is piezoelectric, for example, generates a measuring charge which is able to be measured using measuring lines 30, 31 that are routed out of housing 3 to a suitable evaluation circuit.

Sheathed-element glow plug 1 also has a sleeve-shaped prestressing element 32, that is, a prestressing sleeve 32. Prestressing sleeve 32 is connected, at one end, to collar 15 of support element 7 of heating element 2, and at the other end to fixing element 25. In this context, prestressing sleeve 32 is situated at a distance from an inner housing wall 33, which borders inner chamber 9 in the radial direction, in order to avoid mechanical contact with housing 3. Compensation elements 17, 18 compensate for temperature-related extensions of the components of the force path of sheathed-element glow plug 1, which have an influence on the pressure measurement using pressure sensor 20. In particular, the extension of force transmission sleeve 16, prestressing sleeve 32, fixing element 25, insulating disk 19 and pressure sensor 20 are compensated for. This enables one to achieve great reliability in the pressure measurement at various temperatures, using pressure sensor 20.

Prestressing sleeve 32 prestresses pressure sensor 20 and the additional components provided between collar 15 of support element 7 of heating element 2 and fixing element 25, that is, force transmission sleeve 16, compensation elements 17, 18 and insulating disk 19 with a prestressing force, which amounts to, for instance, 300 N to 500 N at normal temperature. The prestressing is selected such that, in this instance, even at extreme temperatures of application, for instance, at −40° C. a certain prestressing exists. Because of the prestressing, a gap-free contiguousness of the components between collar 15 of support element 7 and fixing element 25 is ensured, so that hysteresis effects are prevented in the pressure measurement. Besides that, in the installed sheathed-element glow plug 1, in which metal diaphragm 8 already has the installation force applied to it, the additional application of prestressing force to metal diaphragm 8 is avoided. Because of this, in the installed state of sheathed-element glow plug 1, there comes about an unloading of metal diaphragm 8 by the amount of the prestressing force, compared to a case in which metal diaphragm 8 has the sum of the installation force and the prestressing force applied to it. Metal diaphragm 8 may therefore be designed to be thin, in particular, and thus elastic, as a result of which the influence of metal diaphragm 8 on the measurement of the pressure is reduced. In addition, a specified prestressing of pressure sensor 20 is achieved, so that one may assume a certain initial point in the sensor characteristics line when evaluating the measuring signals transmitted via measuring lines 30, 31.

Preferably, force transmission sleeve 16 is made of ceramic, in order to insulate metal terminal stud 26 from prestressing sleeve 32, that is preferably made of a metal or a metal alloy.

Because of the sleeve-shaped design of force transmission sleeve 16, compensation elements 17, 18 and fixing element 25, as well as the annular design of pressure sensor 20 and insulating disk 19, these components may be situated to a great extent inside prestressing sleeve 32, and, at the same time, measuring lines 30, 31 and glow current line 28 may be routed, close to axis 11, through inner chamber 9 and to pressure sensor 20, respectively. Consequently, a compact construction of sheathed-element glow plug 1 is possible, as a result of which the length 34 of a pressure measuring module 36, which includes prestressing sleeve 32, collar 15, force transmission sleeve 16, compensation elements 17, 18, pressure sensor 20, insulating disk 19 and fixing element 25, and which reaches at least approximately from sealing cone 4 to a fastening location 35, at which fixing element 25 is connected to housing 3, is able to be reduced in order to shift the natural frequency of pressure measuring module 36 towards higher frequencies. The influencing of the pressure measurement by natural frequencies of pressure measuring module 36 is thereby prevented or at least reduced, even in the case of fast running internal combustion engines.

FIG. 2 shows a sheathed-element glow plug 1 according to a second exemplary embodiment of the present invention. Components already described are here provided with corresponding reference numerals, so that a repetitious description is unnecessary.

In this exemplary embodiment, support pipe 7 of pin-shaped heating element 2 is formed to have a greater diameter at a section 40 at its end that is facing away from the chamber. Moreover, an insulation 41 is provided, and it is provided to be located within force transmission sleeve 16. Section by section, force transmission sleeve 16 encloses a part of ceramic heating member 6, facing away from the chamber, that is surrounded by insulation 41, and is supported in the axial direction by section 40 of support pipe 7. Insulation 41 may be formed by an electrically insulating insulation layer, by which an inner surface of force transmission sleeve 16 is coated, at least section by section. Insulation 41 may also be formed by a sleeve made of electrically insulating material, which is at least partially inserted into force transmission sleeve 16, an outer diameter of insulation 41 being adjusted to the inner diameter of force transmission sleeve 16. Prestressing sleeve 32 is connected to support element 7 at section 40. Force transmission sleeve 16 of the second exemplary embodiment is preferably formed of a metal or a metal alloy, and may be designed to be without stepwise gradations. A thermally caused extension of prestressing sleeve 32 may thereby be compensated for, completely or for the most part, by an equidirectional and appropriately specified extension of force transmission sleeve 16. Because of this, compensation elements 17, 18 may be omitted, compared to the exemplary embodiment shown in FIG. 1. This has the advantage that length 34 of pressure measurement module 36 may be further reduced, so that natural frequencies of pressure measuring module 36 may be shifted even further to higher frequencies. Moreover, the design of metallic force transmission sleeve 16 is considerably more cost-effective than a ceramic force transmission sleeve 16 having a shouldered hole, as shown in FIG. 1. In this case, the electrical insulation is ensured by insulation 41 and insulating disks 19, 23.

Because of a suitable selection of the materials of the components of pressure measuring module 36, it is thus also possible to omit compensation elements 17, 18, and to achieve a short length 34 of pressure measuring module 36, a reduction in the number of gaps and cost reduction.

The present invention is not limited to the exemplary embodiments described.

What is claimed is:

1. A sheathed-element glow plug to be situated in a chamber of an internal combustion engine, comprising:
   a housing;
   a pin-shaped heating element extending partially from the housing; and
   a pressure sensor arranged in an inner chamber of the housing, the pressure sensor, at one end, being in operative connection at least indirectly with the pin-shaped heating element, in order to record an impingement on the heating element conditioned upon a pressure prevailing in the chamber, for determining the pressure prevailing in the chamber, the pressure sensor, at another end, being supported at least indirectly on a fixing element that is connected to the housing;
   wherein a prestressing element is provided which, at one end, is at least indirectly connected to the heating element and, at another end, is at least indirectly connected to the fixing element, the prestressing element applying a prestressing to the pressure sensor via the heating element and the fixing element;
   wherein the prestressing element is arranged as a sleeve-shaped prestressing element, the pressure sensor arranged in an interior of the sleeve-shaped prestressing element.

2. The sheathed-element glow plug according to claim 1, wherein the prestressing element is arranged at a distance from an inner housing wall of the housing.

3. The sheathed-element glow plug according to claim 1, wherein at least one compensation element is provided, the prestressing element applying the prestressing to the compensation element together with the pressure sensor via the heating element and the fixing element, the compensation element configured for at least partial compensation for the impingement on the pressure sensor caused by thermal changes in length of components of a force path of the sheathed-element glow plug.

4. The sheathed-element glow plug according to claim 3, wherein the heating element is in operational connection to the pressure sensor via at least the compensation element.

5. The sheathed-element glow plug according to claim 3, wherein the pressure sensor is supported on the fixing element via the compensation element.

6. The sheathed-element glow plug according to claim 1, wherein a metallic force transmission sleeve is provided, the heating element in operational connection to the pressure sensor via at least the force transmission sleeve, within the force transmission sleeve, a metal terminal stud, connected to the force transmission sleeve, is arranged which is connected to a glow current line, and is arranged to supply electrical energy to the heating element, the force transmission sleeve electrically insulated from the metal terminal stud.

7. The sheathed-element glow plug according to claim 6, wherein an inside surface of the force transmission sleeve is coated with an electrically insulating insulation layer.

8. The sheathed-element glow plug according to claim 6, wherein an electrically insulating sleeve is provided between the metal terminal stud and the force transmission sleeve, which electrically insulates the metal terminal stud from the force transmission sleeve.

9. The sheathed-element glow plug according to claim 1, wherein a metal diaphragm is provided which is connected, at one end, at least indirectly to the heating element and, at another end, at least indirectly to the housing, for sealing the inner chamber from the chamber of the internal combustion engine.

\* \* \* \* \*